United States Patent
Katayama et al.

(10) Patent No.: US 11,156,728 B2
(45) Date of Patent: Oct. 26, 2021

(54) RADIATION DETECTOR

(71) Applicant: Mitsubishi Electric Corporation, Tokyo (JP)

(72) Inventors: Shohei Katayama, Tokyo (JP); Hokuto Fuse, Tokyo (JP); Masaru Tamuro, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 32 days.

(21) Appl. No.: 16/494,465

(22) PCT Filed: May 16, 2017

(86) PCT No.: PCT/JP2017/018283
§ 371 (c)(1),
(2) Date: Sep. 16, 2019

(87) PCT Pub. No.: WO2018/211578
PCT Pub. Date: Nov. 22, 2018

(65) Prior Publication Data
US 2021/0116587 A1    Apr. 22, 2021

(51) Int. Cl.
*G01T 1/20* (2006.01)
*G01T 1/203* (2006.01)
*G01T 1/208* (2006.01)

(52) U.S. Cl.
CPC ........ *G01T 1/20188* (2020.05); *G01T 1/2002* (2013.01); *G01T 1/203* (2013.01); *G01T 1/208* (2013.01)

(58) Field of Classification Search
CPC ... G01T 1/20188; G01T 1/2002; G01T 1/208; G01T 1/203
See application file for complete search history.

(56) References Cited

U.S. PATENT DOCUMENTS

| | | | |
|---|---|---|---|
| 3,684,546 A | * | 8/1972 | Hammond et al. |
| 6,355,932 B1 | * | 3/2002 | Frederick .............. G01T 1/2002 |
| | | | 250/361 R |
| 9,535,177 B2 | * | 1/2017 | Ramsden ................ G01T 1/247 |

FOREIGN PATENT DOCUMENTS

| | | |
|---|---|---|
| JP | 2008122172 A | 5/2008 |
| JP | 2011179855 A | 9/2011 |
| JP | 2013134204 A | 7/2013 |

OTHER PUBLICATIONS

International Search Report (PCT/ISA/210) dated Aug. 15, 2017, by the Japan Patent Office as the International Searching Authority for International Application No. PCT/JP2017/018283.

(Continued)

*Primary Examiner* — Kiho Kim
(74) *Attorney, Agent, or Firm* — Buchanan Ingersoll & Rooney PC (57) ABSTRACT

A radiation detector includes: a detector case which has an opening portion, a reflector which is attached to the opening portion of the detector case, a plastic scintillator which is disposed inside of the detector case, with a clearance from the reflector, a light guide into which fluorescence emitted from the plastic scintillator enters, a photo multiplier tube at which the fluorescence having passed through the light guide enters, and a pre amplifier which converts an output of the photo multiplier tube into a current pulse; wherein the plastic scintillator or the light guide has a soaked layer of ammonia which is formed on a surface thereof. This radiation detector is improved in the chemical resistance to the process fluid which includes a corrosive gas.

7 Claims, 7 Drawing Sheets

(56) References Cited

OTHER PUBLICATIONS

Written Opinion (PCT/ISA/237) dated Aug. 15, 2017, by the Japan Patent Office as the International Searching Authority for International Application No. PCT/JP2017/018283.

* cited by examiner

FIG. 7

RADIATION DETECTOR

FIELD OF THE INVENTION

The present invention relates to a radiation detector, and more particularly, relates to a radiation detector which is improved in the chemical resistance to a corrosive gas.

BACKGROUND OF THE INVENTION

In a nuclear power generation station, a radioisotope handling facility, and the like, process fluids are used and exhausted. Process fluids, such as water, gas, and others, are used in the process of the facility, and then, contain radiation substances. In order to control the radiation substance which is contained in the process fluid, a radiation detector is used. The radiation detector uses a scintillator, which absorbs a radioactive ray, entering from the outside, and converts it into light (fluorescence).

By the way, high pH-ization to the process fluid is promoted in the nuclear power plant, the handling facility of radioisotope, and the like. The high pH-ized process fluid is added with ammonia or ammonia compounds or others. That is to say, an under test gas, which will flow into a radiation detector, contains a corrosive gas which will be used in the process fluid.

In these kinds of radiation detectors, a reflecting material (a reflector) is disposed on a radioactive ray incident face side of a plastic scintillator. The reflecting material (the reflector) is provided in order to collect the light which the plastic scintillator emitted, efficiently to a photo multiplier tube by way of a light guide. This reflecting material reflects in an efficient way the emitted light from a plastic scintillator, toward a light guide.

The reflecting material needs to present a high degree of brilliancy, in order to secure high reflection efficiency. On this account, aluminum material has been used for the reflecting material of a radiation detector from past to present. Because aluminum material is hard to stick on a plastic scintillator directly, a thin sheet of Mylar (a registered trademark) on which aluminum is vapor deposited, is used as a reflector.

Polyester films, such as Mylar, are high in the transmission factor of the radioactive ray, and then, can be preferably used as a base material of a reflector. Because a reflecting material, which includes a Mylar sheet formed of aluminum vapor deposition film, is small in the attenuation of radioactive rays, and can secure high reflection efficiency, it is advantage to the reflecting material that a radiation detector can have an enhanced sensitivity in radiation detection.

In this way, on the radioactive ray incident face side of the plastic scintillator, the reflecting material (the reflector) which includes a Mylar sheet formed of an aluminum vapor deposition layer is disposed. In this case, the aluminum vapor deposition film which will be used as a reflecting layer is configured to be exposed on the outside, as it is. In a general operating environment, even in a radiation detector of such a configuration, the reflecting material can secure sufficient high reflection efficiency over a long period of time.

In a nuclear power plant and the like, since high pH-ization to a process fluid is promoted, ammonia or ammonia compounds are added in the process fluid. Under the high pH-ized operating environment, aluminum, which will become a reflecting layer, is eluted by a chemical reaction, and the aluminum vapor deposition film loses its gloss gradually. As a result, it is cared about that the reflecting material will be reduced in reflection efficiency and the radiation detector may have a reduced sensitivity in the radiation detection.

Plastic scintillators are deliquescent in their nature. Then, proposed is a plastic scintillator which is coated with a plastic coating film on the radioactive ray incident face side and its peripheral surface, and in addition, includes a metallic film formed by vacuum evaporation. The vacuum evaporated metal film, which will be used together with the plastic coating film, works as a reflecting material. Also in this type of plastic scintillator, the aluminum vapor deposited film is configured to be exposed on the outside, as it is. Since the reflecting material is still in contact with the process fluid which is in the high pH-ized state and includes ammonia and so forth, the vacuum evaporated metal film is subject to cause a chemical reaction. For this reason, it is cared about that the reflecting material will be reduced in the reflection efficiency and the sensitivity in the radiation detection may fall.

In order to solve the above mentioned issue, proposed is a plastic scintillator which is coated with a reflecting material consisting of titanium oxide, on the radioactive ray incident face side (for example, refer to Patent Document 1). The reflecting material which consists of titanium oxide reflects the emitted light from the plastic scintillator toward a light guide. The radiation detector, which is coated with the reflecting material consisting of titanium oxide, is capable of measuring radioactive rays stably, with least influence even from the high pH-ized operating environment.

CITATION LIST

Patent Literature

Patent Document 1: JP 2008-122172 A
Patent Document 2: JP 2013-134204 A
Patent Document 3: JP 2011-179855 A

SUMMARY OF THE INVENTION

Technical Problem

When a plastic scintillator, a light guide, and a vacuum evaporated metal film of a reflecting material (a reflector) are used in the environment where the process fluid which contains a corrosive gas, as an under test gas, is fed on a steady basis, the degradation will proceed and the sensitivity of the radiation detection will fall. In the radiation detector which is presented in Patent Document 1, reflecting material which consists of titanium oxide is coated on a radiation incident face of the plastic scintillator. As for this reflecting material, there remains a subject that the reflecting material will have a reduced reflective power, by a corrosive gas.

The present application is made in order to solve the above mentioned subject of a radiation detector, and an object of the present application is to provide a reliable radiation detector, where improvements in the chemical resistance to the process fluid which includes a corrosive gas are achieved.

Solution to Problem

A radiation detector according to the present application includes: a detector case which has an opening portion, a reflector which is attached to the opening portion of the detector case, a plastic scintillator which is disposed inside of the detector case, with a clearance from the reflector, a light guide into which fluorescence emitted from the plastic scintillator enters, a photo multiplier tube at which the fluorescence having passed through the light guide enters, and a pre amplifier which converts an output of the photo multiplier tube into a current pulse; wherein the plastic scintillator or the light guide has a soaked layer of ammonia which is formed on a surface thereof.

Advantageous Effects of Invention

A radiation detector according to the present application includes: a detector case which has an opening portion, a reflector which is attached to the opening portion of the detector case, a plastic scintillator which is disposed inside of the detector case, with a clearance from the reflector, a light guide into which fluorescence emitted from the plastic scintillator enters, a photo multiplier tube at which the fluorescence having passed through the light guide enters, and a pre amplifier which converts an output of the photo multiplier tube into a current pulse; wherein the plastic scintillator or the light guide has a soaked layer of ammonia which is formed on a surface thereof. Then, in the radiation detector, a soaked layer of ammonia is formed on the surface. By using a plastic scintillator or a light guide which has absorbed ammonia previously, the change in collection efficiency, regarding a process fluid which includes a corrosive gas, is suppressed. Thereby, it becomes possible to obtain a highly reliable radiation detector which is capable of measuring the radiation stably over a long period of time, where the deterioration in the radiation detection efficiency is suppressed.

DETAILED DESCRIPTION OF THE INVENTION

Hereinafter, a radiation detector according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the radiation detector are further actually provided with a plurality of members, for ease of explanation, only portions necessary for explanation will be described and other portions are omitted.

Embodiment 1

Figure 1:
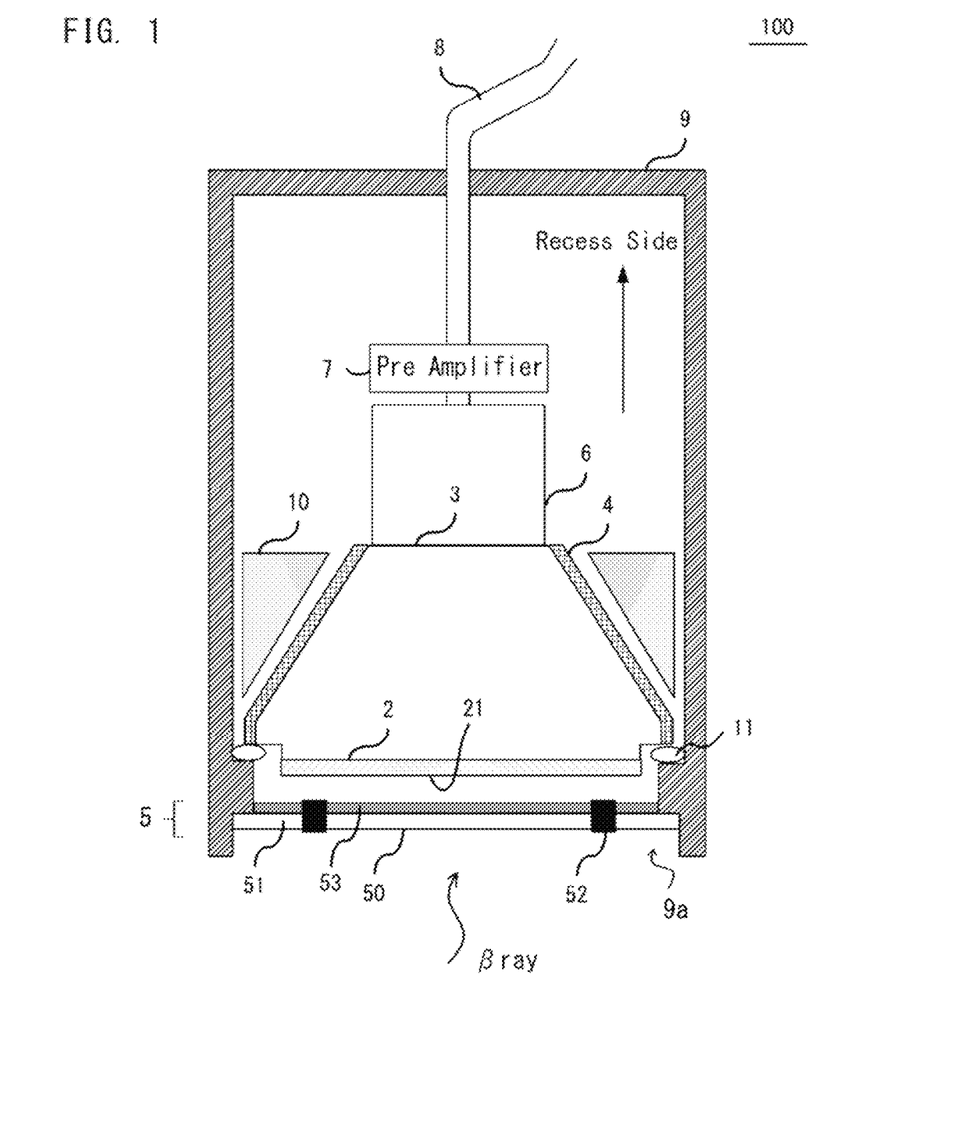
FIG. 1 is a sectional drawing which illustrates an overall configuration of a radiation detector in accordance with Embodiment 1 of the present application.

Hereinafter, explanation will be made about the configuration of the radiation detector in accordance with the embodiments of the present application, based on drawings. FIG. 1 is a sectional drawing for showing the overall configuration of the radiation detector in accordance with Embodiment 1 of the present application. In the drawing, the arrow shows an incident direction of the radioactive ray (the beta ray). The radiation detector 100 in accordance with the present embodiment is composed of a plastic scintillator 2, a light guide 3, a reflective coating material 4, a reflector 5, a photo multiplier tube 6, a pre amplifier 7, a cable 8, a detector case 9, a cushion 10, a packing 11, and so forth. The plastic scintillator 2 is joined with the light guide 3, by optical jointing material.

The plastic scintillator 2 absorbs radioactive rays which entered from the outside, and converts them into light (fluorescence). The light guide 3 has reflective coating material 4 which is coated on the side face of the circumference side thereof, and the radiation detector is designed to lead the emitted light from the plastic scintillator 2 to the photo multiplier tube 6 in an efficient manner. On the radioactive ray incident face side of the plastic scintillator 2, a reflector 5 is provided with a clearance in between. The reflector 5 reflects a part of emitted light from the plastic scintillator 2 toward the light guide 3, where the part of emitted light travels to the radioactive ray incident face side, which is the opposite side of the light guide 3.

The light guide 3 is joined with the photo multiplier tube 6, by the optical jointing material. The photo multiplier tube 6 converts the emitted light from the plastic scintillator 2 into electrons and amplifies them, and then, generates an output as an electric signal. The pre amplifier 7 converts a current pulse which is outputted from the photo multiplier tube 6 into a voltage pulse, and outputs the pulse. The cable 8 sends out the output signal from the pre amplifier 7 to an electronic circuit which is on the subsequent stage (not shown in the drawing). The detector case 9 has an opening portion 9a, which introduces radioactive rays, such as a beta ray, into the plastic scintillator 2. It is to be noted that a direction which heads to the photo multiplier tube 6 from the opening portion 9a, into which radioactive rays enter, is referred to as a recess side of the detector case.

The detector case 9 contains the plastic scintillator 2, the light guide 3, the photo multiplier tube 6, and the pre amplifier 7. The plastic scintillator 2 and the reflector 5 are disposed so as to face the opening portion 9a of the detector case 9. On the inside of the detector case 9, a cushion 10 is provided for fixing the light guide 3. A packing 11, which is provided on a seal part between the light guide 3 and the detector case 9, ensures air tightness on the inside of the detector case 9.

The reflector 5 of the radiation detector 100 in accordance with the present embodiment has a polyethylene terephthalate film 51 (a PET film) and an aluminum vapor deposited layer 53. The aluminum vapor deposited layer 53 consists of aluminum which is vapor deposited on one side of the polyethylene terephthalate film 51, where the film will become a radiation transparent substrate. As a reflective metal layer, this aluminum vapor deposited layer 53 is disposed so as to oppose the radiation incident face 21 of the plastic scintillator 2. Therefore, the reflector 5 is disposed, with a metal layer (an aluminum vapor deposited layer 53) directing to the recess side of the detector case. However, the metal which will be vapor deposited on the polyethylene terephthalate film 51 of plastic film is not limited to aluminum, and any metal which is capable of securing predetermined reflection efficiency and presenting a high degree of brilliancy can be employed.

A sheet like reflector 5 is, in a removable manner, attached to the opening portion 9a of the detector case 9, with a screw, a horseshoe shaped spring, and so forth. The horseshoe shaped spring will be inserted into a groove which is formed in the opening portion 9a of the detector case 9. Because the reflector 5 is attached to the opening portion 9a in a removable manner, it is possible to inspect visually the soundness of an optical jointing material. In order to lead the emitted light from the plastic scintillator 2 toward the photo multiplier tube 6 in an efficient manner, material which has a refractive index comparable to that of the light guide 3 will be selected as optical jointing material. The refractive index of air is 1.0, while the refractive index of optical jointing materials, such as silicone oil, is about 1.5.

Air bubbles by the optical jointing material may be produced into a space between the plastic scintillator 2 and the light guide 3, and a space between the light guide 3 and the photo multiplier tube 6. In that case, light enters into those air bubbles, and then, the course direction of the light is changed largely, and the transmission efficiency of the light will be reduced. Silicone oil is used in the joined part of the light guide 3 and the photo multiplier tube 6. Silicone oil, which is an optical jointing material, loses included oil through evaporation and varies across the ages in property. Because silicone oil becomes face powdered through the variation across the ages, it will become a cause of the reduction in the light transmission efficiency. However, since it is not possible to judge from the output fluctuation of a sensor whether these air bubbles or the face powdered state of oil causes the reduction in the output of the radiation detector 100, visual inspection is needed to check the joined part.

Radioactive rays, such as a beta ray, penetrate a reflector 5. The reflector 5 has a pressure balancing hole 52. The pressure balancing hole 52 is provided in order to cancel the pressure difference between the radiation incident face 50 and the opposite side face, in other words, the difference between the internal and external pressures of the detector case 9. On the radioactive ray incident face side, the radiation detector 100 is provided with a sampling gas container (not shown in the drawing) which accumulates a process fluid, a gas to be measured. The gas to be measured, which is inhaled from the atmospheric air with a pump, will be led into this sampling gas container. The inside of the detector case 9 is at an atmospheric pressure. In a case where the reflector 5 does not have a pressure balancing hole 52, the detector case 9 will have a pressure difference between the inside and the outside, because the sampling gas container is inhaled with a pump and the inside of the case becomes a negative pressure.

It is a common concern that this pressure difference may make the reflector 5 warp, and may induce the decline in the reflection efficiency, or the reflector 5 may be broken. Further, the reflection efficiency of the reflector 5 and the instruction value of the output will be varied, due to the change in the warping of the reflector 5. Since stable operations as a radiation detector are prevented, the reflector 5 is provided with a pressure balancing hole 52. This configuration cancels the above mentioned pressure difference, and then, the warping of the reflector 5 is prevented.

Figure 2:
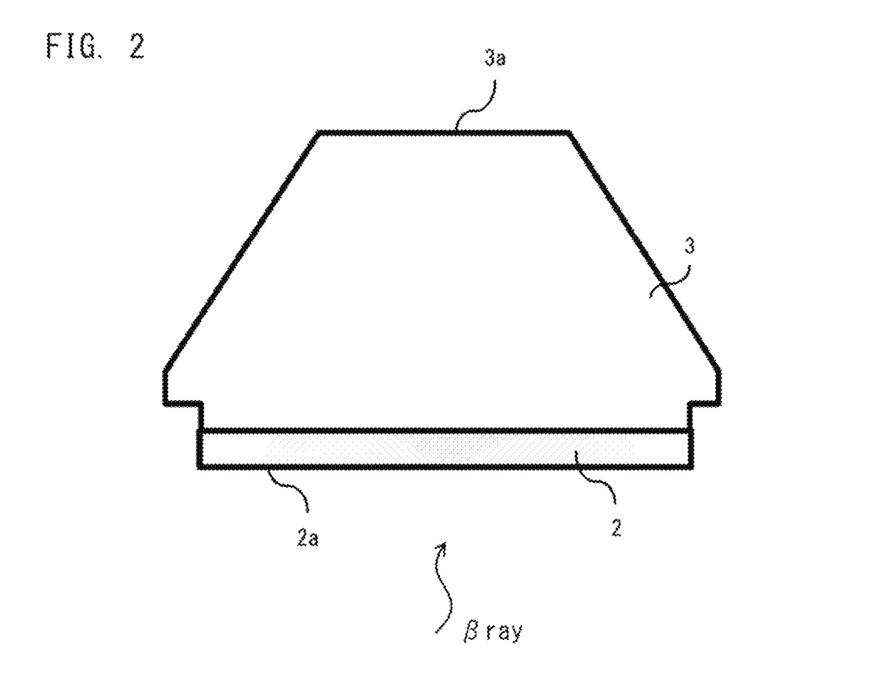
FIG. 2 is a sectional drawing which illustrates a configuration of a plastic scintillator and a light guide in accordance with Embodiments of the present application.

FIG. 2 illustrates a plastic scintillator 2 and a light guide 3, with which the radiation detector 100 is provided. Because the plastic scintillator 2 and the light guide 3 underwent the treatment to absorb ammonia previously, before they are attached to the detector, a soaked layer 2a and a soaked layer 3a are formed vaguely on the surfaces of the plastic scintillator 2 and the light guide 3, respectively. The absorption method is assumed to be aging in an ammonia gas or in an ammonia solution. Process fluid which contains corrosive gases is always fed into the radiation detector 100, through a pressure balancing hole 52. The plastic scintillator 2 and the light guide 3, on which ammonia absorption is performed beforehand, can prevent the change in the collection efficiency, since the plastic scintillator 2 and the light guide 3 are provided with the soaked layer 2a and the soaked layer 3a, respectively.

As mentioned above, the radiation detector 100 in accordance with Embodiment 1 of the present application employs the plastic scintillator 2 and the light guide 3, on which the ammonia absorption is performed previously. Since the plastic scintillator 2 and the light guide 3 have a soaked layer 2a and a soaked layer 3a, the change in the collection efficiency is suppressed, with respect to the process fluid which includes a corrosive gas. Thereby, the decline in the detection efficiency of the radioactive ray is suppressed and the measurement of the radioactive ray can be attained stably over a long period of time. According to Embodiment 1 of the present application, these features make it possible to provide a radiation detector 100 which is excellent in the chemical resistance and high in the reliability.

The radiation detector according to the present application includes; a plastic scintillator which converts radiation into light; a photo multiplier tube which converts the emitted light from the plastic scintillator into electrons and amplifies them; a light guide which leads the emitted light from the plastic scintillator to the photo multiplier tube; a detector case which has an opening portion for introducing the radiation into the plastic scintillator, and contains the plastic scintillator, the photo multiplier tube, and the light guide; and a reflector which is attached to the opening portion of the detector case in a removable manner, and reflects the emitted light from the plastic scintillator toward the light guide. By using the plastic scintillator and the light guide on which ammonia absorption is performed previously, a means to suppress the change in the collection efficiency to a corrosive gas is provided.

Therefore, the radiation detector in accordance with the present application includes: a detector case which has an opening portion, a reflector which is attached to the opening portion of the detector case, a plastic scintillator which is disposed inside of the detector case, with a clearance from the reflector, a light guide into which fluorescence emitted from the plastic scintillator enters, a photo multiplier tube at which the fluorescence having passed through the light guide enters, and a pre amplifier which converts an output of the photo multiplier tube into a current pulse; wherein the plastic scintillator or the light guide has a soaked layer of ammonia which is formed on a surface thereof.

Embodiment 2

Figure 3:
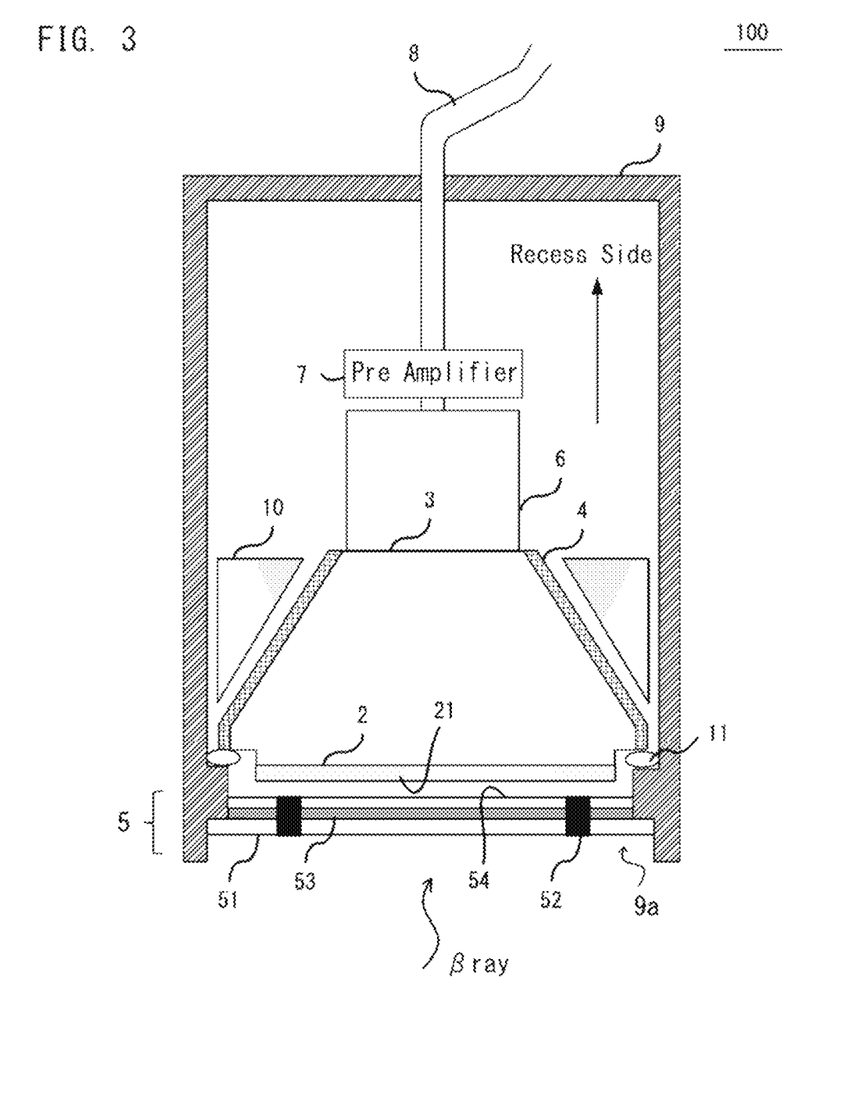
FIG. 3 is a sectional drawing which illustrates an overall configuration of a radiation detector in accordance with Embodiment 2 of the present application.

Hereinafter, explanation will be made about the configuration of the radiation detector in accordance with Embodiment 2 of the present application, based on the drawing. FIG. 3 is a sectional drawing for showing the overall configuration of the radiation detector in accordance with Embodiment 2 of the present application. In the drawing, the arrow shows an incident direction of the radioactive ray (the beta ray). The radiation detector 100 in accordance with the present embodiment is composed of a plastic scintillator 2, a light guide 3, a reflective coating material 4, a reflector 5, a photo multiplier tube 6, a pre amplifier 7, a cable 8, a detector case 9, a cushion 10, a packing 11, and so forth. The plastic scintillator 2 is joined with the light guide 3, by the optical jointing material.

The plastic scintillator 2 absorbs radioactive rays which entered from the outside, and converts them into light (fluorescence). The light guide 3 has reflective coating material 4 which is coated on the side face of the circumference side thereof, and the radiation detector is designed to lead the emitted light from the plastic scintillator 2 toward the photo multiplier tube 6 in an efficient manner. On the radioactive ray incident face side of the plastic scintillator 2, a reflector 5 is provided with a clearance in between. The reflector 5 reflects a part of emitted light from the plastic scintillator 2 toward the light guide 3, where the part of emitted light travels to the radioactive ray incident face side, which is the opposite side of the light guide 3.

The light guide 3 is joined with the photo multiplier tube 6, by the optical jointing material. The photo multiplier tube 6 converts the emitted light from the plastic scintillator 2 into electrons and amplifies them, and then, generates an output as an electric signal. The pre amplifier 7 converts a current pulse, which is outputted from the photo multiplier tube 6, into a voltage pulse, and outputs the pulse. The cable 8 sends out the output signal from the pre amplifier 7 to an electronic circuit which is on the subsequent stage (not shown in the drawing). The detector case 9 has an opening portion 9a which introduces radioactive rays, such as a beta ray, into the plastic scintillator 2. It is to be noted that a direction which heads to the photo multiplier tube 6 from the opening portion 9a, into which radioactive rays enter, is referred to as a recess side of the detector case.

The reflector 5 of the radiation detector 100 in accordance with the present embodiment has a polyethylene terephthalate film 51 (a PET film), an aluminum vapor deposited layer 53, and a protective layer 54. The aluminum vapor deposited layer 53 consists of aluminum, which is vapor deposited on one side of the polyethylene terephthalate film 51, which is an plastic film. As for the reflector 5 in accordance with the present embodiment, the protective layer 54 of polyparaxylylene resin is vapor deposited additionally on the aluminum vapor deposited layer 53. The protective layer 54 of polyparaxylylene resin is disposed so as to oppose a radiation incident face 21 of the plastic scintillator 2. The metal which will be vapor deposited on the polyethylene terephthalate film 51 is not limited to aluminum, and any metal which is capable of securing predetermined reflection efficiency and presenting a high degree of brilliancy can be employed.

Resins which transmit light and are excellent in the weather resistance and the chemical resistance are suitable for the protective layer 54 of the aluminum vapor deposited layer 53, and in the present embodiment, polyparaxylylene resin, which is coated at a normal temperature, is used. The protective layer 54 of polyparaxylylene resin is excellent in the resistance to corrosive gases, and pinhole free thin films of polyparaxylylene resin are easy to form. Further, because the resin can be coated at a normal temperature, it is possible to form a protective layer 54 (a polyparaxylylene resin layer), without giving heat stress to the plastic scintillator 2. Coating the polyparaxylylene resin on the surface of the reflector 5 at a normal temperature makes it possible to prevent the reduction in the reflection efficiency of the reflector 5. That is to say, the reflector 5 includes a polyparaxylylene resin layer which is formed on the metal layer.

As mentioned above, the radiation detector 100 in accordance with the present embodiment employs polyparaxylylene resin which is vapor deposited or coated on the surface of a reflective metal layer, and then, the reduction in the reflection efficiency can be suppressed. Because the reflector 5 is improved in the chemical resistance significantly, the reduction in the detection efficiency of the radioactive ray is suppressed and the measurement of the radioactive ray can be attained stably over a long period of time. According to the present embodiment, these features make it possible to provide a radiation detector 100 which is high in the reliability and is excellent in the chemical resistance. Further, it is obvious that the change in the collection efficiency with respect to the process fluid including a corrosive gas is suppressed, by using the plastic scintillator 2 and the light guide 3 on which ammonia absorption is performed previously.

The radiation detector according to the present application, includes a plastic scintillator which converts radiation into light; a photo multiplier tube which converts the emitted light from the plastic scintillator into electrons and amplifies them; a light guide which leads the emitted light from the plastic scintillator to the photo multiplier tube; a detector case which has an opening portion for introducing the radiation into the plastic scintillator, and contains the plastic scintillator, the photo multiplier tube, and the light guide; and a reflector which is attached to the opening portion of the detector case in a removable manner, and reflects the emitted light from the plastic scintillator toward the light guide. By vapor depositing polyparaxylylene resin to the reflector, a means to suppress the change in the reflective power of a reflective metal layer is provided. Further, by using the plastic scintillator and the light guide on which ammonia absorption is performed previously, a means to suppress the change in the collection efficiency to a corrosive gas is provided.

Embodiment 3

Figure 4:
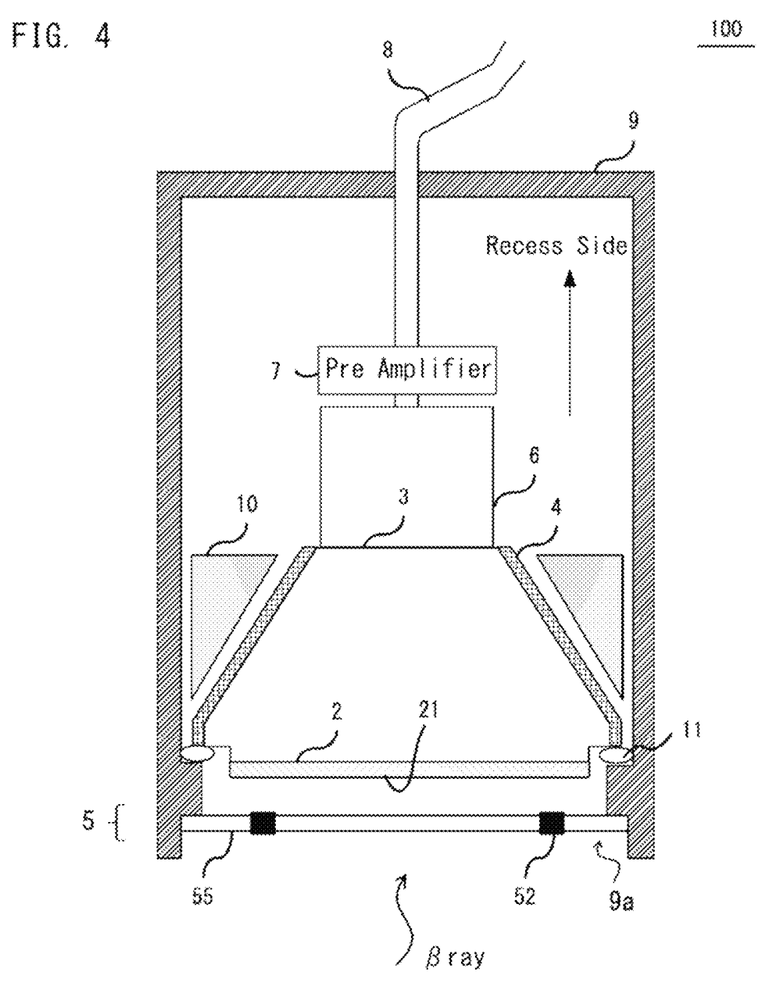
FIG. 4 is a sectional drawing which illustrates an overall configuration of a radiation detector in accordance with Embodiment 3 of the present application.

Hereinafter, explanation will be made about the configuration of the radiation detector in accordance with Embodiment of the present application, based on drawings. FIG. 4 is a sectional drawing showing the overall configuration of the radiation detector in accordance with Embodiment 3 of the present application. In the drawing, the arrow shows an incident direction of the radioactive ray (the beta ray). The radiation detector 100 according to the present embodiment is composed of a plastic scintillator 2, a light guide 3, a reflective coating material 4, a reflector 5, a photo multiplier tube 6, a pre amplifier 7, a cable 8, a detector case 9, a cushion 10, a packing 11, and so forth. The plastic scintillator 2 is joined with the light guide 3, by the optical jointing material.

The plastic scintillator 2 absorbs radioactive rays which entered from the outside, and converts them into light (fluorescence). The reflective coating material 4 is coated on the side face of the circumference side of the light guide 3, and the radiation detector is designed to lead the emitted light from the plastic scintillator 2 to the photo multiplier tube 6 in an efficient manner. On the radioactive ray incident face side of the plastic scintillator 2, a reflector 5 is provided with an air space in between. The reflector 5 reflects a part of emitted light from the plastic scintillator 2 toward the light guide 3, where the part of emitted light travels to the radioactive ray incident face side, which is the opposite side of the light guide 3.

The light guide 3 is joined with the photo multiplier tube 6, by the optical jointing material. The photo multiplier tube 6 converts the emitted light from the plastic scintillator 2 into electrons and amplifies them, and then, generates an output as an electric signal. The pre amplifier 7 converts a current pulse, which is outputted from the photo multiplier tube 6, into a voltage pulse, and outputs the pulse. The cable 8 sends out the output signal from the pre amplifier 7 to an electronic circuit which is on the subsequent stage (not shown in the drawing). The detector case 9 has an opening portion 9a which introduces radioactive rays, such as a beta ray, into the plastic scintillator 2. It is to be noted that a direction which heads to the photo multiplier tube 6 from the opening portion 9a, into which radioactive rays enter, is referred to as a recess side of the detector case.

In the above mentioned Embodiment 2, a description is made that vapor depositing a protective layer 54 of polyparaxylylene resin on the aluminum vapor deposited layer 53 formed on a PET film (a radiation transparent substrate) has improved the corrosion resistance and suppressed the decline in the reflection efficiency. In the present embodiment, a stainless steel sheet 55 is employed in the reflector 5, which will be used for the radiation detector 100 in accordance with the above mentioned Embodiment 2. The sheet like stainless steel plate will become glossy by performing buff processing on the surface thereof, and then, a radiation detector which has corrosion resistance and high reflection factor can be provided. That is to say, in the present embodiment, a stainless steel sheet which has the corrosion resistance and high reflexivity is used for the reflector 5.

As mentioned above, the radiation detector 100 in accordance with the present embodiment uses a stainless steel sheet in the reflector 5, and then, the chemical resistance of the detector improves significantly. Thereby, the radiation detector 100 is suppressed in the decline of the radiation detection efficiency, and it becomes possible to measure the radiation stably over a long period of time. According to the present embodiment, these features make it possible to provide a radiation detector 100 which is highly reliable and is excellent in the chemical resistance. It is to be noted that, also in the radiation detector according to the present embodiment, it is obvious that when a plastic scintillator 2 and a light guide 3 which are absorbed with ammonia beforehand are used, the change in the collection efficiency, with respect to the process fluid including corrosive gases, will be suppressed.

Embodiment 4

Figure 5:
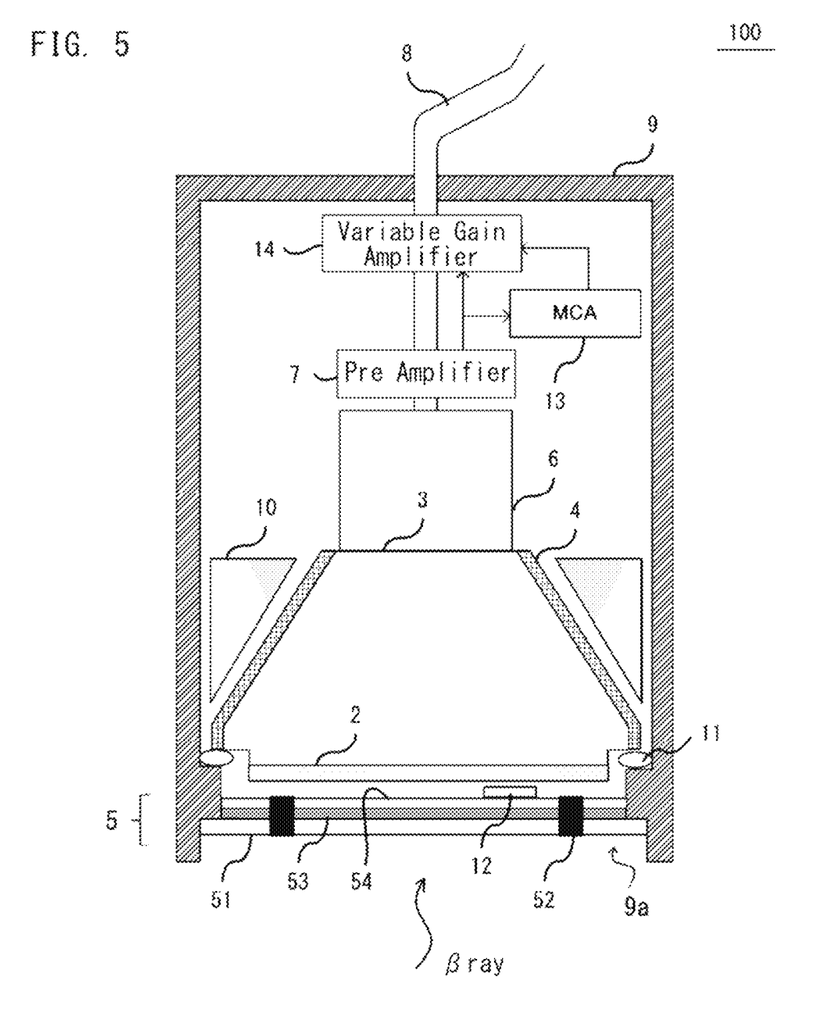
FIG. 5 is a first sectional drawing which illustrates an overall configuration of a radiation detector in accordance with Embodiment 4 of the present application.

Hereinafter, explanation will be made about the configuration of the radiation detector in accordance with Embodiment 4 of the present application, based on drawings. FIG. 5 is a sectional drawing showing the overall configuration of the radiation detector in accordance with Embodiment 4 of the present application. In the drawing, the arrow shows an incident direction of the radioactive ray (the beta ray). The radiation detector 100 in accordance with the present embodiment is composed of a plastic scintillator 2, a light guide 3, a reflective coating material 4, a reflector 5, a photo multiplier tube 6, a pre amplifier 7, a cable 8, a detector case 9, a cushion 10, a packing 11, an index pulsar 12, a multichannel analyzer 13, a variable gain amplifier 14, and so forth. The plastic scintillator 2 is joined with the light guide 3, by the optical jointing material.

The plastic scintillator 2 absorbs radioactive rays which entered from the outside, and converts them into light (fluorescence).

The reflective coating material 4 is coated on the side face of the circumference side of the light guide 3, and the radiation detector is designed to lead the emitted light from the plastic scintillator 2 toward the photo multiplier tube 6 in an efficient manner.

On the radioactive ray incident face side of the plastic scintillator 2, a reflector 5 is provided with a clearance in between.

The reflector 5 reflects a part of emitted light from the plastic scintillator 2 toward the light guide 3, where the part of emitted light travels to the radioactive ray incident face side, which is the opposite side of the light guide 3.

The light guide 3 is joined with the photo multiplier tube 6, by the optical jointing material. The photo multiplier tube 6 converts the emitted light from the plastic scintillator 2 into electrons and amplifies them, and then, generates an output as an electric signal. The pre amplifier 7 converts the current pulse which is outputted from the photo multiplier tube 6 into a voltage pulse, and outputs the pulse. The cable 8 sends out the output signal from the pre amplifier 7 to an electronic circuit which is on the subsequent stage (not shown in the drawing). The detector case 9 has an opening portion 9a which introduces radioactive rays, such as a beta ray, into the plastic scintillator 2. It is to be noted that a direction which heads to the photo multiplier tube 6 from the opening portion 9a, into which radioactive rays enter, is referred to as a recess side of the detector case.

The reflector 5 of the radiation detector 100 in accordance with the present embodiment has a polyethylene terephthalate film 51 (a PET film), an aluminum vapor deposited layer 53, and a protective layer 54. The aluminum vapor deposited layer 53 consists of aluminum, which is vapor deposited on one side of the polyethylene terephthalate film 51 which is a plastic film. As for the reflector 5 in accordance with the present embodiment, the protective layer 54 of polyparaxylylene resin is vapor deposited additionally on the aluminum vapor deposited layer 53. The protective layer 54 of polyparaxylylene resin is disposed so as to oppose the radiation incident face 21 of the plastic scintillator 2. The metal which will be vapor deposited on the polyethylene terephthalate film 51 is not limited to aluminum, and any metal which is capable of securing predetermined reflection efficiency and presenting a high degree of brilliancy can be employed.

Resins, which transmit light and are excellent in the weather resistance and the chemical resistance, are suitable for the protective layer 54 of the aluminum vapor deposited layer 53, and in the present embodiment, polyparaxylylene resin which is coated at a normal temperature is employed. The protective layer 54 of polyparaxylylene resin is excellent in the tolerance to corrosive gases, and pinhole free thin films of the resin are easy to form. Further, because the resin can be coated at a normal temperature, the protective layer 54 (the polyparaxylylene resin layer) can be formed without giving heat stress to the plastic scintillator 2. It becomes possible to prevent the change in the reflection efficiency of the reflector 5, by coating polyparaxylylene resin on the surface of the reflector 5 at a normal temperature.

Figure 6:
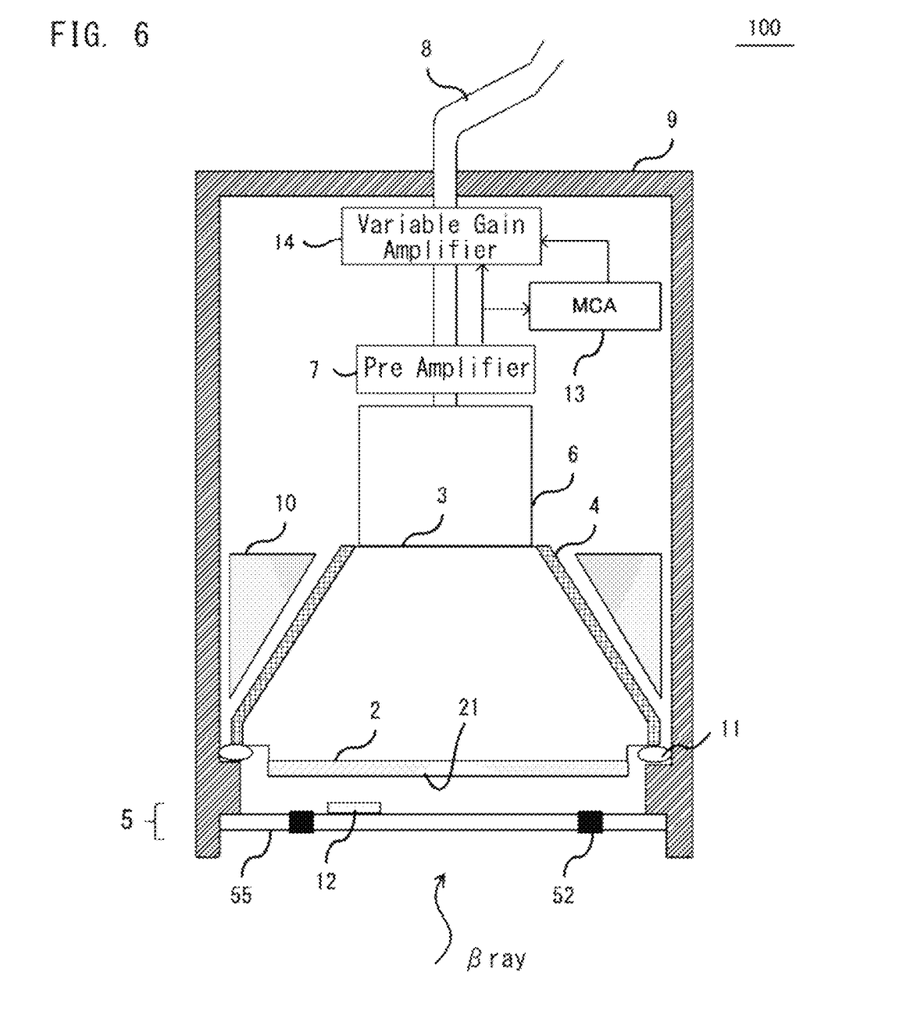
FIG. 6 is a second sectional drawing which illustrates an overall configuration of the radiation detector in accordance with Embodiment 4 of the present application.

In the present embodiment, it is obvious that a stainless steel sheet, which has corrosion resistance and high reflexivity, can be used as a reflector 5. FIG. 6 is a sectional drawing showing the overall configuration of a radiation detector, in accordance with Embodiment 4 of the present application, which has a stainless steel sheet. The radiation detector 100 in accordance with the present embodiment is further provided with an index pulsar 12, a multichannel analyzer 13, and a variable gain amplifier 14, compared with the radiation detectors according to Embodiments 1 to 3. The index pulsar 12 emits a radioactive ray which will become a standard.

The radioactive ray which the index pulsar 12 emits has an energy (for example, an energy of 1.9 MeV), higher than the measurement range of the radioactive ray, which is contained in the process fluid. The multichannel analyzer 13 has a function to count the calculated number in the wave form of the pre amplifier 7, in every channel. The multichannel analyzer 13 counts the calculated number of the index pulsar peak of 1.9 MeV, and shows a constant calculated number, when in normal. Based on the output of the multichannel analyzer 13, gain correcting of a detector signal will be performed to the variable gain amplifier 14.

Figure 7:
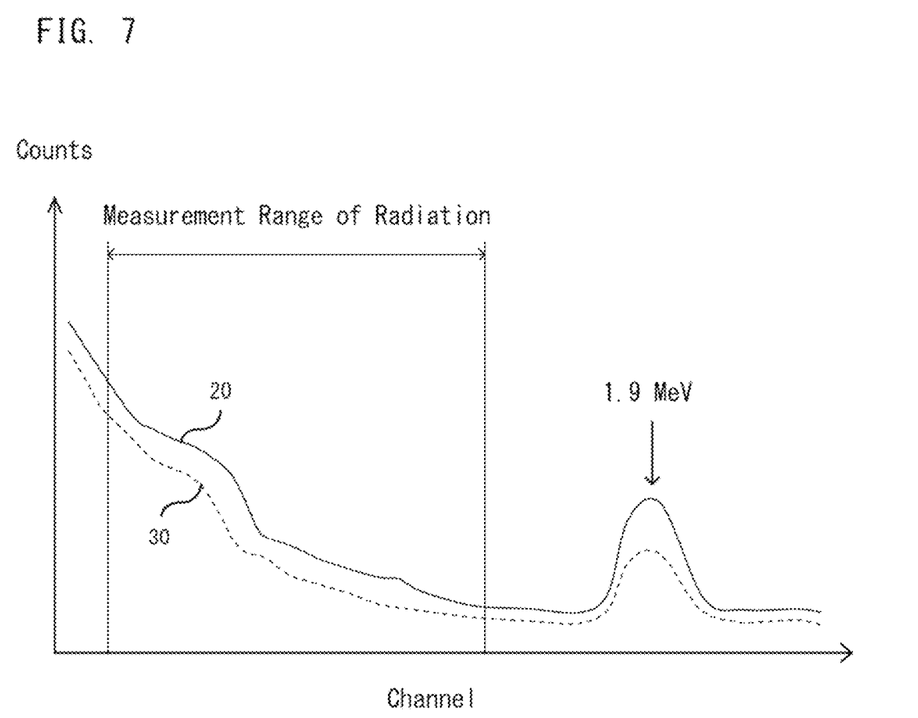
FIG. 7 is a drawing which shows the signal of the radiation detector in accordance with Embodiment 4 of the present application.

FIG. 7 shows the results of signal analysis, which are carried out to the wave form of the pre amplifier 7, by the multichannel analyzer 13. Among characteristics, the characteristic 20 is a typical curve for representing a signal which the radiation detector in a normal state has outputted. The characteristic 30 is a typical curve for representing a signal which the radiation detector in a deteriorated state has outputted. Because the count (calculated number) decreases in a case where the plastic scintillator 2 or the light guide 3 or the like is in a deteriorated state, the insufficiency is corrected in the multichannel analyzer 13.

Further, the reduced signal due to the decrease in the collection efficiency is corrected, by performing gain correction for a detector signal to the variable gain amplifier 14. As a result, the radiation detector generates no apparent degradation. This function of the radiation detector makes it possible to provide a radiation detector which has strong resistance against corrosive gases. That is to say, the radiation detector according to the present embodiment has an index pulsar and a signal correction function, and performs automatic correction in the signal, for the reduction in the collection efficiency.

Note that, in the present invention, each of the embodiments can be freely combined, appropriately modified and/or eliminated without departing from the scope of the invention.

INDUSTRIAL APPLICABILITY

The radiation detector in accordance with the present application can be used as a radiation detector, for measuring and managing the radiation substance contained in the gas, used or discharged in the process of a nuclear power plant, a handling facility of radioisotope, and so forth.

EXPLANATION OF NUMERALS AND SYMBOLS

2 Plastic Scintillator: 2a Soaked layer: 3 Light guide: 3a Soaked layer: 4 Reflective coating material: 5 Reflector: 6 Photo multiplier tube: 7 Pre amplifier: 8 Cable: 9 Detector case: 9a Opening portion: 10 Cushion: 11 Packing: 12 Index pulsar: 13 Multichannel analyzer: 14 Variable gain amplifier: 20 Characteristic: 21 Radiation incident face: 30 Characteristic: 50 Radiation incident face: 51 Polyethylene terephthalate film: 52 Pressure balancing hole: 53 Aluminum vapor deposited layer: 54 Protective layer: 55 Stainless steel sheet: 100 Radiation Detector

What is claimed is:

1. A radiation detector comprising:
    a detector case which has an opening portion,
    a reflector which is attached to the opening portion of the detector case,
    a plastic scintillator which is disposed inside of the detector case, with a clearance from the reflector,
    a light guide into which fluorescence emitted from the plastic scintillator enters,
    a photo multiplier tube at which the fluorescence having passed through the light guide enters, and
    a pre amplifier which converts an output of the photo multiplier tube into a current pulse;
    wherein the plastic scintillator or the light guide has a soaked layer of ammonia which is formed on a surface thereof for preventing a change in collection efficiency.

2. The radiation detector according to claim 1,
    wherein the reflector consists of a sheet like plastic film and a metal layer which is formed on the plastic film.

3. The radiation detector according to claim 2,
    wherein the reflector has a polyparaxylylene resin layer which is formed on the metal layer.

4. The radiation detector according to claim 2,
    wherein the reflector is disposed with the metal layer formed on the plastic film directing to a recess side of the detector case.

5. The radiation detector according to claim 1,
    wherein the reflector consists of a stainless steel sheet.

6. The radiation detector according to claim 1,
    wherein an index pulsar is attached to a space between the plastic scintillator and the reflector.

7. The radiation detector according to claim 6, further comprising,
    a multichannel analyzer which analyzes an output of the pre amplifier, and
    a variable gain amplifier which converts the output of the pre amplifier into a voltage pulse;
    wherein gain correction of the variable gain amplifier is performed based on an output of the multichannel analyzer.

* * * * *